(12) United States Patent
Topf, Jr.

(10) Patent No.: US 11,378,220 B2
(45) Date of Patent: Jul. 5, 2022

(54) SATURATION SYSTEMS AND METHODS FOR PIPELINE AND PRESSURE VESSEL REPAIR

(71) Applicant: That's A Wrap LLC, Blue Island, IL (US)

(72) Inventor: Henry E. Topf, Jr., Wellsboro, PA (US)

(73) Assignee: THAT'S A WRAP LLC, Blue Island, IL (US)

( * ) Notice: Subject to any disclaimer, the term of this patent is extended or adjusted under 35 U.S.C. 154(b) by 190 days.

(21) Appl. No.: 16/772,554

(22) PCT Filed: Dec. 14, 2018

(86) PCT No.: PCT/US2018/065780
§ 371 (c)(1),
(2) Date: Jun. 12, 2020

(87) PCT Pub. No.: WO2019/125955
PCT Pub. Date: Jun. 27, 2019

(65) Prior Publication Data
US 2020/0386360 A1  Dec. 10, 2020

Related U.S. Application Data

(60) Provisional application No. 62/599,909, filed on Dec. 18, 2017.

(51) Int. Cl.
*F16L 55/18* (2006.01)
*F16L 55/168* (2006.01)
(Continued)

(52) U.S. Cl.
CPC .............. *F16L 55/18* (2013.01); *B32B 43/00* (2013.01); *B65D 85/02* (2013.01);
(Continued)

(58) Field of Classification Search
CPC ..... B32B 43/00; B29L 2023/22; B65D 85/02; B29C 73/04; B29C 73/10; B29C 73/12;
(Continued)

(56) References Cited

U.S. PATENT DOCUMENTS 2,814,313 A * 11/1957 Holbrook .............. B29C 53/825
156/190
5,632,307 A    5/1997 Fawley et al.
(Continued)

FOREIGN PATENT DOCUMENTS

EP       2 600 051 A1   6/2013
GB        2140529      11/1984
(Continued)

OTHER PUBLICATIONS

International Preliminary Report on Patentability for PCT/US2018/065780 dated Jul. 2, 2020, 9 pgs.
(Continued)

*Primary Examiner* — Philip C Tucker
*Assistant Examiner* — Brian R Slawski
(74) *Attorney, Agent, or Firm* — Crowell & Moring LLP (57) ABSTRACT

A system (10) for reinforcing a pipeline (90) or pressure vessel includes a dispenser (12), a quantity of fabric (14), and a resin (16). The dispenser (12) has a first end (39), a second end (32), and a slot (46) formed in a wall (48), and is pressurizable via a fluid input (74) to a pressurized state. The dispenser (12) has a seal (56) configured to permit the quantity of fabric (14) to pass through the slot (46) and retain pressure within the dispenser (12). The dispenser (12) is configured to dispense the quantity of fabric (14) through the slot (46). The quantity of fabric (14) has a first width (24).

20 Claims, 11 Drawing Sheets

(51) Int. Cl.
*B65D 85/02* (2006.01)
*B32B 43/00* (2006.01)
*B29L 23/00* (2006.01)
*F16L 55/163* (2006.01)
*F16L 55/1645* (2006.01)
*B29C 65/78* (2006.01)
*B29C 73/12* (2006.01)
*B29C 65/48* (2006.01)
*B29C 63/06* (2006.01)
*B29C 63/02* (2006.01)

(52) U.S. Cl.
CPC ........ *F16L 55/1686* (2013.01); *B29C 63/024* (2013.01); *B29C 63/06* (2013.01); *B29C 65/48* (2013.01); *B29C 65/7888* (2013.01); *B29C 73/12* (2013.01); *B29L 2023/22* (2013.01); *F16L 55/163* (2013.01); *F16L 55/1645* (2013.01)

(58) Field of Classification Search
CPC ......... B29C 73/24; B29C 65/00; B29C 65/48; B29C 65/483; B29C 65/78; B29C 65/7879; B29C 65/7876; B29C 65/7888; B29C 65/7894; B29C 63/06; B29C 63/024
USPC ..... 156/60, 94, 98, 184, 185, 187, 285, 349, 156/381, 382, 390, 391, 392, 443, 446, 156/448, 449, 450, 456, 457, 459, 468, 156/475, 486, 538, 574, 575, 577, 578; 138/97, 98, 99
See application file for complete search history.

(56) References Cited

U.S. PATENT DOCUMENTS

| | | |
|---|---|---|
| 7,673,654 B2 | 3/2010 | Rice |
| 7,740,028 B1 | 6/2010 | Wilson et al. |
| 7,900,655 B2 | 3/2011 | Morton et al. |
| 8,591,695 B2 | 11/2013 | Warren |
| 2006/0070676 A1 | 4/2006 | Blackmore, Jr. |
| 2006/0272724 A1 | 12/2006 | Borland et al. |
| 2010/0078118 A1 | 4/2010 | Ehsani |
| 2011/0139351 A1 | 6/2011 | Morton |
| 2014/0299217 A1 | 10/2014 | Grundmann |
| 2016/0010779 A1 | 1/2016 | Warren |
| 2016/0010785 A1 | 1/2016 | Arnold et al. |
| 2016/0303823 A1 | 10/2016 | Whitledge et al. |

FOREIGN PATENT DOCUMENTS

| | | | | |
|---|---|---|---|---|
| GB | 2542857 | 4/2017 | | |
| GB | 2542857 | 5/2017 | | |
| JP | 03297627 A | * 12/1991 | ............. | F16L 55/18 |
| WO | WO200886738 | 7/2008 | | |
| WO | WO201755809 | 4/2017 | | |

OTHER PUBLICATIONS

Communication pursuant to Rules 161(1) and 162 EPC for Application No. 18833756.2 dated Jul. 28, 2020, 3 pgs.
International Search Report and Written Opinion for PCT/US2018/065780 dated Mar. 28, 2019, 12 pgs.
Frost, Simon R., Walker Technical Resources, Presentation entitled, "Technowrap composite repairs for the maintenance of piping, pipelines, vessel or structural integrity", Retrieved on Sep. 29, 2017: http://compositerepairstudy.com/downloads/Detailed_WTR_technical_presentation-SES.pdf.
DiamondWrap® I Citadel Technologies, Retrieved on Sep. 29, 2017 http://cittech.com/portfolio/diamondwrap/.
Furmanite Comprehensive Products and Services Brochure Retrieved on Sep. 29, 2017: http://www.furmanite.com/wp-content/uploads/2015/02/Furmanite_ServicesBrochure_AllPages_FINAL_Rev1_SPR.pdf.
PRT PowerSleeve® / Field Wetted, Piping Repair Technologies, Retrieved on Sep. 29, 2017: http://pipingrepairtechnologies.com/product-information/prtpowersleeve-field-wetted.
EP Communication from corresponding EP application No. 18 833 756.2-1015, dated Apr. 8, 2022, 6pp.

* cited by examiner

SATURATION SYSTEMS AND METHODS FOR PIPELINE AND PRESSURE VESSEL REPAIR

RELATED APPLICATIONS

The present patent document is a § 371 filing based on PCT Application Serial No. PCT/US2018/065780, filed Dec. 14, 2018 (and published as WO 2019/125955 A1 on Jun. 27, 2019), designating the United States and published in English, which claims the benefit of the filing date under 35 U.S.C. § 119(e) of Provisional U.S. Patent Application Ser. No. 62/599,909, filed Dec. 18, 2017. All of the foregoing applications are hereby incorporated by reference in their entirety.

PRIORITY CLAIM

This invention claims the benefit of priority of U.S. Provisional Application Ser. No. 62/599,909, entitled "Saturation Systems and Methods for Pipeline and Pressure Vessel Repair," filed Dec. 18, 2017, which is hereby incorporated by reference in its entirety.

BACKGROUND

The present embodiments relate generally to systems and methods for repairing compromised pipelines and pressure vessels that include anomalies caused by corrosion, mechanical strikes, degradation, or other imperfections in the pipeline or pressure vessel. The disclosed systems generally utilize a composite combination of polymeric material and reinforced fabric.

The systems and methods described herein address the increasing need for pipeline and pressure vessel repair, maintenance and upgrading. Urban, metropolitan, and even rural areas throughout the world depend on pipelines to convey drinking water, wastewater, irrigation water, and liquid and gaseous fuel. Indeed, dependency upon pipelines and pressure vessels has helped society to achieve an advanced state. Given the dependency upon such infrastructure, various disruptions could have significant humanitarian and economic consequences. For this reason, infrastructure operators, construction companies, public agencies, and other entities are often required to maintain pipelines and pressure vessels under contractual agreements and/or regulatory schemes.

Nevertheless, pipeline and pressure vessel failures are common occurrences. Common causes include environmental factors (ranging from erosion to traumatic natural disasters), corrosion, mechanical impacts, or simply a lack of maintenance. Such factors may create anomalies in pipelines and pressure vessels prior to complete failure, and such anomalies may often be repaired.

The pipeline and pressure vessel repair systems and methods disclosed herein provide numerous key advantages, including but not limited to: enabling compromised pipelines and pressure vessels to resume operation at Maximum Allowable Operating Pressure ("MAOP") without shutdown and depressurization; allowing repair to be accomplished while eliminating the potential for additional anomalies common to other repair methods, e.g., welding and creating dissimilar metallic corrosion cells; eliminating the need for expensive supplemental repair evaluation, e.g., x-ray and yield analysis; and reducing repair cost as compared to other repair methods by minimizing waste and utilizing inexpensive-yet-effective materials.

The systems and methods disclosed herein result in a proven and documented anomaly repair through the application of an exothermic fabric-reinforced polymeric composite that meets or exceeds U.L., A.S.M.E., and D.O.T. standards. Furthermore, the disclosed systems and methods seek to minimize safety and health risks by minimizing exposure to potentially hazardous chemicals, reducing time spent at the repair site, and limiting system weight.

SUMMARY

In one aspect, a system for reinforcing a pipeline or pressure vessel may include a quantity of fabric, a resin, and a dispenser having a first end, a second end, and a slot formed in a wall. The quantity of fabric may have a first width. The dispenser may be pressurizable via a fluid input to a pressurized state, and may include a seal configured to permit the quantity of fabric to pass through the slot and retain pressure within the dispenser. The dispenser may be configured to dispense the quantity of fabric through the slot. The slot may have a second width that is greater than or equal to the first width. The seal may be configured to retain at least five pounds per square inch of pressure within the dispenser while the quantity of fabric passes through the slot. The seal may include at least one of a movable plate and a removable insert. A length of the quantity of fabric may be at least five times longer than a circumference of the pipeline or pressure vessel to be repaired. The dispenser may include a hollow section, a first end cap, and a second end cap. The resin may have a viscosity less than or equal to 1.5 centipoise. The quantity of reinforcing fabric may be mounted upon a rod comprising resin access apertures.

In another aspect, a kit may include a resin and a quantity of fabric installed within a dispenser. The dispenser may include a first end, a second end, a fluid input, a slot, and a seal configured to permit the quantity of fabric to pass through the slot and retain pressure within the dispenser. The dispenser may be configured to dispense the quantity of fabric through the slot, and may be configured to be pressurized via the fluid input up to at least five pounds per square inch. A leading portion of the quantity of fabric may be pre-loaded through the slot.

In another aspect, a method for repairing a pipeline or pressure vessel may include adding an activated resin into a dispenser containing a quantity of fabric, pressurizing the dispenser, waiting for at least part of the quantity of fabric to achieve a saturation state; and dispensing the at least part of the quantity of fabric that achieves the saturated state through the slot. The quantity of fabric may have a first width. The dispenser may include a slot formed in a wall and having a second width that is greater than or equal to the first width. The dispenser may further include a seal adapted to the slot and configured to permit the quantity of fabric to pass through the slot. The method may further include a step of removing the seal from the slot prior to dispensing the at least part of the quantity of fabric. The step of adding the activated resin into the dispenser may include putting enough activated resin to submerge the quantity of fabric. The step of pressurizing the dispenser may include injecting pressurized air into the dispenser. The method may further include a step of depressurizing the dispenser before dispensing at least part of the quantity of fabric through the slot. The step of dispensing at least part of the quantity of fabric through the slot may include wrapping at least part of the quantity of fabric around an anomaly after the quantity of fabric achieves the saturated state by dispensing the quantity of fabric through the slot. The step of pressurizing the dispenser may include pressurizing the dispenser to at least three pounds per square inch. The step of pressurizing the dispenser may include pressurizing the dispenser to at least ten pounds per square inch, e.g., for at least thirty seconds. The method may further include the steps of removing an exterior coating from a repair area around the anomaly, prepping the repair area, and applying a first product to fill the anomaly. The saturated state may be achieved when the activated resin penetrates at least 75% of the quantity of fabric.

Other systems, methods, features and advantages of the invention will be, or will become, apparent to one with skill in the art upon examination of the following figures and detailed description. It is intended that all such additional systems, methods, features and advantages be within the scope of the invention, and be encompassed by the following claims.

BRIEF DESCRIPTION OF THE DRAWINGS

The systems and methods disclosed herein can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
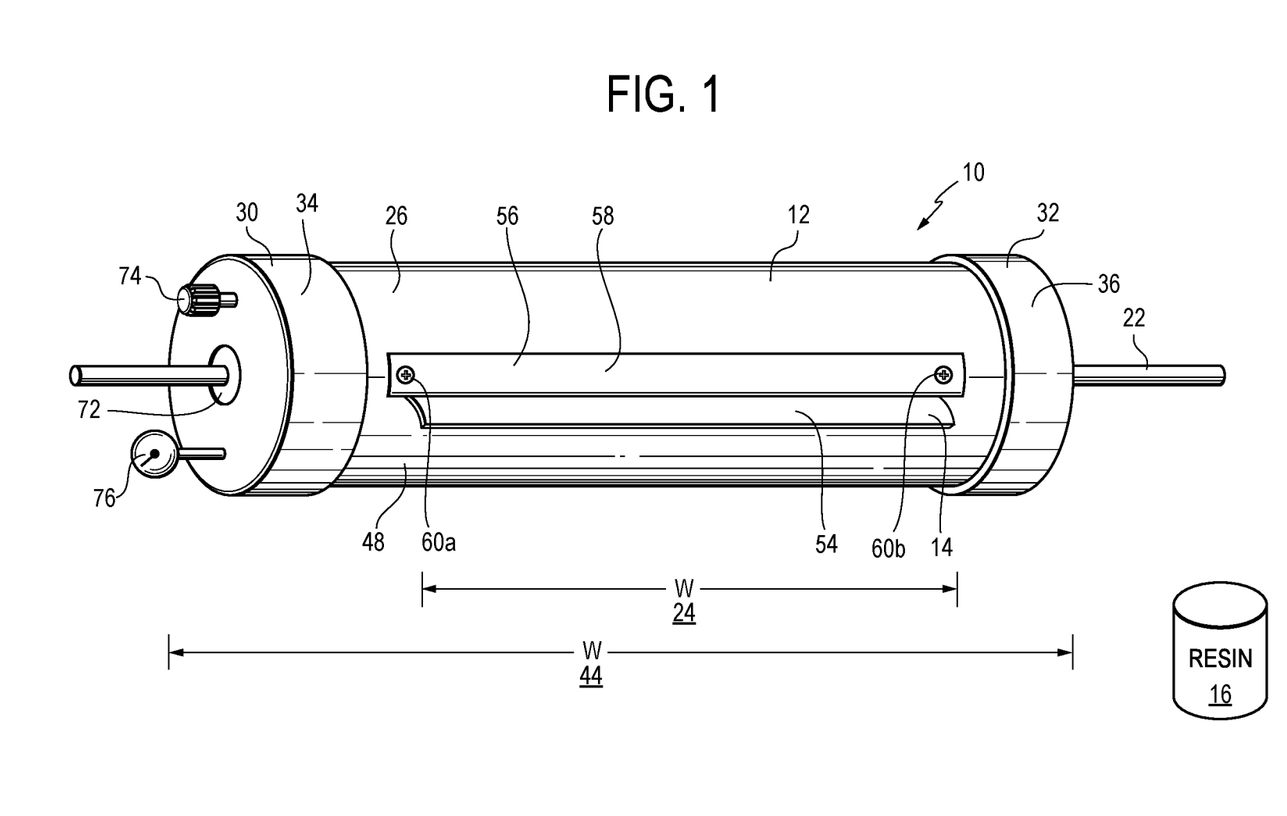
FIG. 1 shows one aspect of a pipeline and pressure vessel repair system.
Figure 2:
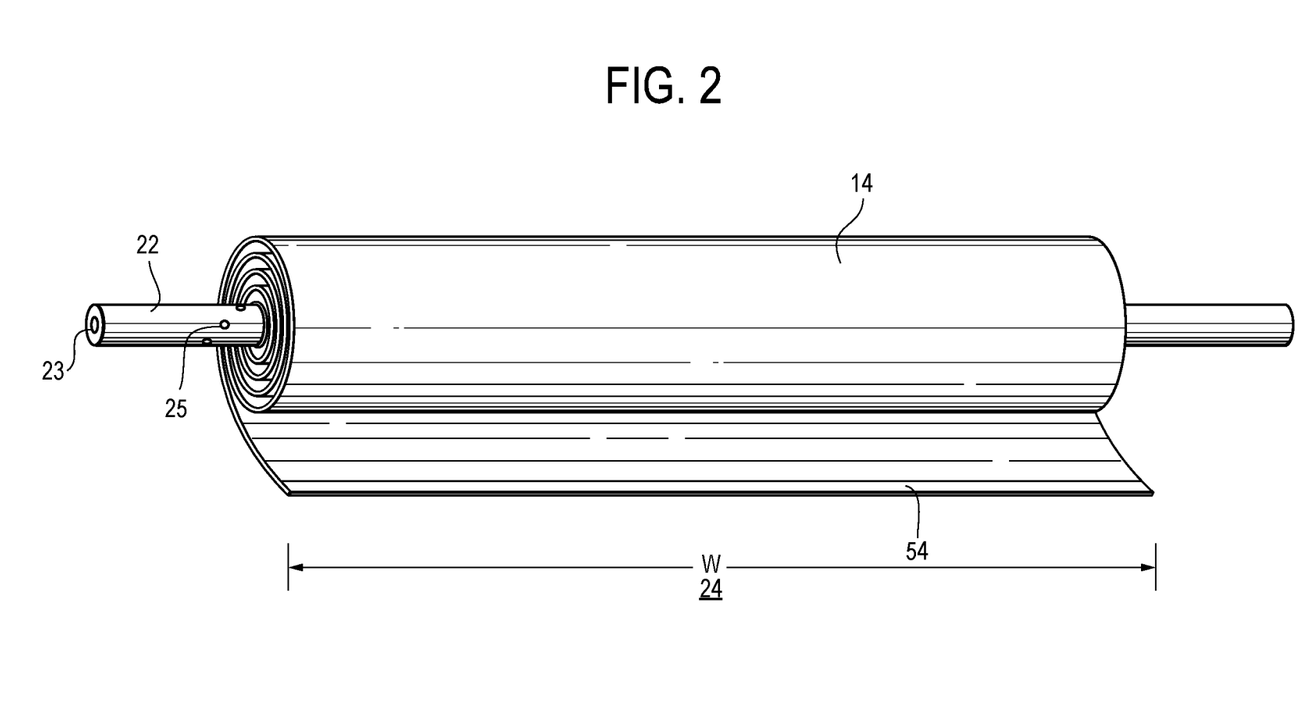
FIG. 2 shows other aspects of the pipeline and pressure vessel repair system of FIG. 1.

Referring to FIGS. 1-2, a system 10 for repairing defects or anomalies in pipelines and/or pressure vessels may include a dispenser 12, a quantity of reinforcing fabric 14 configured to be dispensed from the dispenser 12, and a quantity of resin 16. The dispenser 12 facilitates saturation of the reinforcing fabric 14 with the resin 16 for subsequent application to a compromised pipeline or pressure vessel, where the resin-saturated fabric 14 cures to form a fabric-reinforced polymeric composite. As used herein, "saturation" may mean the resin permeates the reinforcing fabric 14, even if the reinforcing fabric 14 could theoretically absorb more resin 16. Optionally, the system 10 may include quantities of primer and anomaly filling resin, and other components, e.g., an air pump and an electric thermal wrap.

Components of the system 10 may be sold individually or as a kit. In particular, the system 10 may be sold as an assembled kit, with the reinforcing fabric 14 loaded into the dispenser 12. Components of the system 10 may be selected and sized with reference to a compromised pipeline or pressure vessel to be repaired, and also with reference to one or more anomalies located in/on the compromised pipeline or pressure vessel. When utilized according to the methods disclosed herein, the systems 10 may enhance the structural integrity of the compromised pipeline or pressure vessel, allowing the pipeline to resume operation at maximum allowable operating pressure ("MAOP"). For brevity and without intending to limit the scope of the disclosure, the following discussion generally refers to a pipeline, in particular a compromised pipeline. However, the disclosed systems 10 and methods are equally applicable to pressure vessels, e.g., spherical, cylindrical, or other pressure vessels.

The reinforcing fabric 14 may have a high tensile strength and a relatively high resistance to tearing and penetration, e.g., carbon-reinforced fabric (such a carbon fiber fabric), fiberglass, and Kevlar fabric. Such reinforcing fabric 14 may be woven or knitted, and may or may not be epoxy- or resin-impregnated, but should remain sufficiently flexible to permit wrapping around the compromised pipeline. To facilitate dispensing and assembly, the reinforcing fabric 14 may be mounted on a rod 22 (or an axle, a dowel, roll, or similar object) made of wood, fiberglass, metal, cardboard, or similar rigid and inexpensive material. Although the rod 22 may be solid, it may have a hollow cavity 23 that may connect to one or more integral channels and/or one or more resin access apertures 25 to enable the resin 16 to penetrate internal surfaces of the reinforcing fabric 14 (i.e., so the resin 16 may absorb into the reinforcing fabric 14 from the "inside-out"). In other embodiments, the reinforcing fabric 14 may be fold-stacked (i.e., similar to a sheet of continuous printer paper) rather than mounted on a rod 22, or may have another storage configuration that enables continuous deployment from the dispenser 12.

The dimension of reinforcing fabric 14 may depend upon the particular application and between embodiments. In particular, the reinforcing fabric 14 may have a width 24 that may depend upon the size and location of an anomaly. Generally, the fabric width 24 may range from approximately twelve inches to approximately forty-eight inches, e.g., eighteen, twenty-four, thirty, thirty-six, forty-two, or forty-eight inches. To maximize the efficacy of the repair, it may be desirable for the fabric width 24 to be sufficiently wide such that the reinforcing fabric 14 may be wrapped around the anomaly and extend beyond the anomaly by at least approximately six inches on either side. For this reason, a reinforcing fabric 14 having a width 24 significantly less than twelve inches may not be desirable. In most cases, the fabric width 24 may not be too wide so as to cause the dispenser 12, fabric 14, and resin 16 to have a combined weight that is more than two, three, or four adult humans can safely lift, e.g., approximately fifty pounds for a system 10 intended for use by two persons, approximately seventy-five pounds for a system 10 intended for use by three persons, approximately one hundred pounds for a system 10 intended for use by four persons, etc. The reinforcing fabric 14 also has a length (i.e., an unrolled length or fully-dispensed length) that may be a function of the circumference of the compromised pipeline. For example, it may be desirable for the fabric 14 to have a length sufficiently long to enable the fabric to be wrapped around the anomaly at least five complete times. In other words, the fabric length may be at least five times greater than the circumference of the compromised pipeline, e.g., six, seven, eight, nine, ten, eleven, or twelve times greater than the compromised pipeline circumference. Beyond a certain threshold, e.g., ten times the compromised pipeline circumference, additional fabric length may not yield proportionate additional strength to the fabric-reinforced polymeric composite. To the contrary, fabric dimensions that are greater than necessary to safely repair an anomaly contribute to excess weight, cost, and waste. Additionally, the fabric 14 has a thickness that may depend upon its particular composition and intended application. Although in some embodiments the fabric 14 may remain dry until saturated in the resin 16 as described below, in other embodiments the fabric 14 may be pre-saturated in an inactive resin component, which may be later activated by saturating the fabric 14 in another resin component. In such embodiments, the pre-saturated fabric 14 may come separately packaged (e.g., in a disposable film or wrapper) or assembled within the dispenser 12 (described below).

The resin 16 may include polymers such as epoxies or other resins that exhibit strong mechanical properties when activated and cured, i.e., when the resin 16 forms a cross-linked thermoset. In particular, the resin 16 should increase the strength of the fabric-reinforced polymeric composite when the fabric 14 is saturated with the resin 16 and the resin 16 cures. For example, an appropriate resin 16 may be selected to enable the fabric-reinforced polymeric composite to meet certain standards, e.g., ASTM PCC 2 and Title 49, Part 192 of the Code of Federal Regulations. To facilitate saturation and reduce repair time, the resin 16 may have a sufficiently low viscosity to enable saturation of the reinforcing fabric 14 when placed under pressurized conditions, e.g., approximately five to fifteen pounds per square inch. This characteristic will help ensure that the resin 16 permeates the reinforcing fabric 14, thereby creating a uniform fabric-reinforced polymeric composite. Suitable resin viscosities may range from approximately 0.1 centipoise to approximately 1.5 centipoise at approximately 70 degrees Fahrenheit, e.g., approximately 1.0 centipoise. Once activated, e.g., after mixing with a hardener or other component, the resin 16 should have a pot life long enough to enable one or more users to saturate the reinforcing fabric 14 with the resin 16 and apply the resin-saturated reinforcing fabric 14 to the compromised pipeline. For example, the resin 16 may have a pot life ranging from approximately twenty minutes to ninety minutes.

Figure 3A:
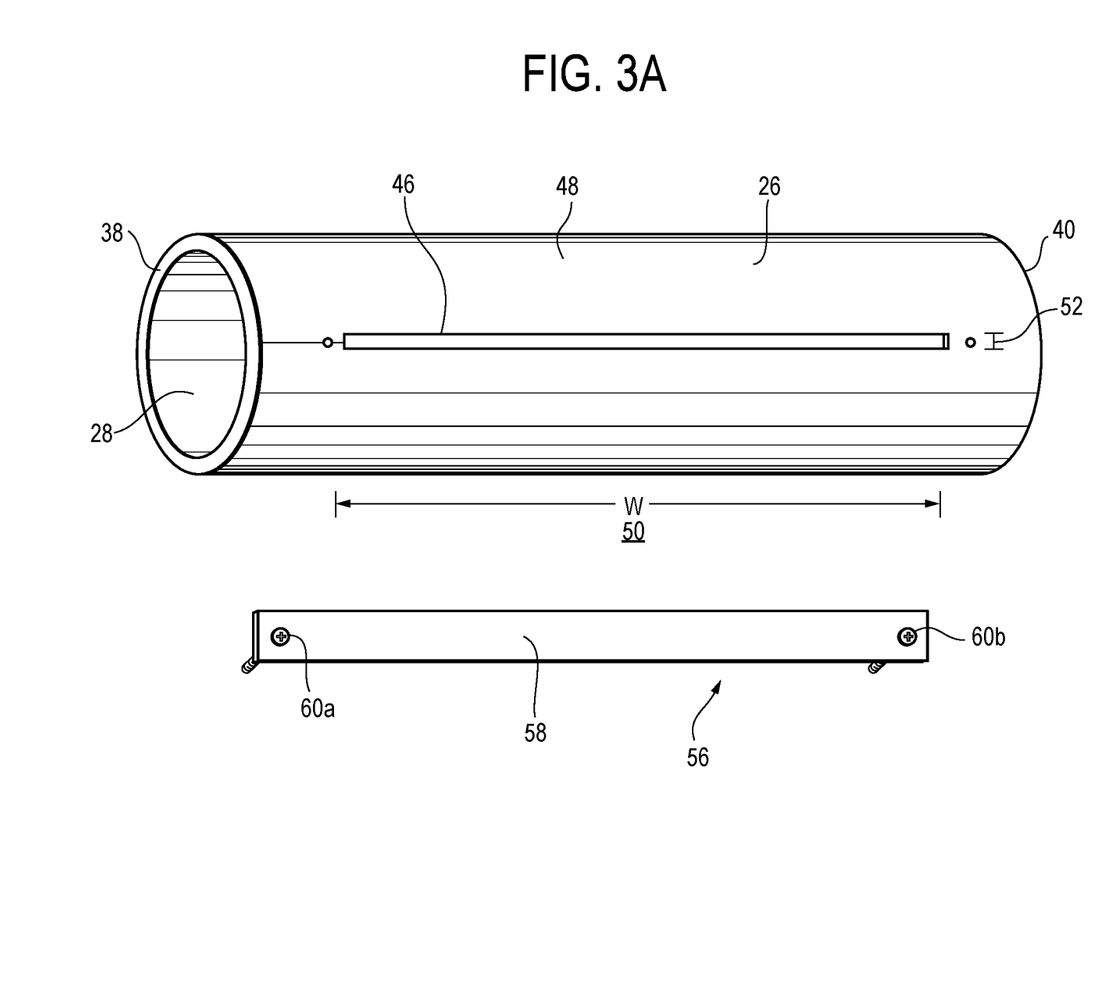
FIG. 3A shows other aspects of the pipeline and pressure vessel repair system of FIG. 1.
Figure 4:
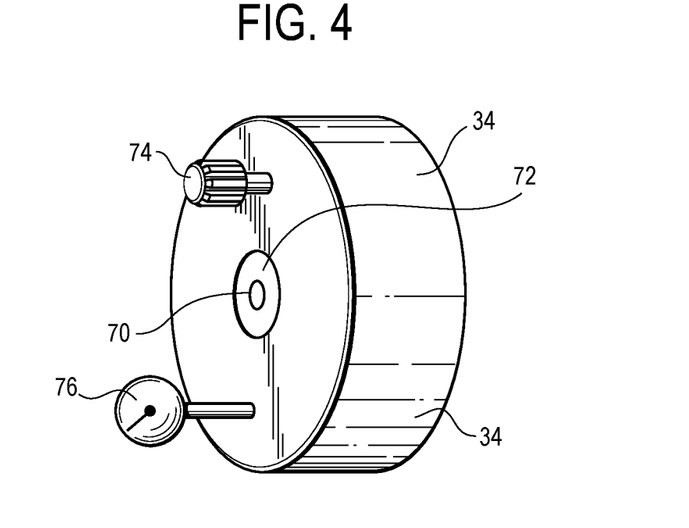
FIG. 4 shows other aspects of the pipeline and pressure vessel repair system of FIG. 1.

Referring again to FIG. 1, now in conjunction with FIGS. 3A-4, the dispenser 12 may have numerous forms, but generally includes a hollow section 26 with an internal cavity 28 dimensioned to receive the quantity of reinforcing fabric 14. The dispenser 12 includes a closed first end 30 and a closed second end 32, either or both of which may be integral to the hollow section 26 or, referring to FIGS. 1 and 4, may include one or more distinct components, e.g., a first end cap 34 and a second end cap 36 may be securable to first and second ends 38, 40, respectively of the hollow section 26. In embodiments with one or more end caps 34, 36, the end caps 34, 36 may be secured to the hollow section 26 (as in FIG. 1) by a number of joining structures, e.g., adhesives, screw threads, friction fit, or other suitable structures. For example, the second end cap 36 may be permanently secured to the second end 40 of the hollow section 26, while the first end cap 34 may be removably joined with the first end 38 of the hollow section 26 via screw threads to enable a user to access the internal cavity 28. In other embodiments, both end caps 34, 36 may be permanently affixed to the hollow section 26, and may include means to access the internal cavity and insert the reinforcing fabric 14 therethrough (e.g., a door, a plug, etc.). The dispenser 12 may include access means in locations other than at the ends 30, 32. For example, the hollow section 26 may include access means.

To accommodate the quantity of reinforcing fabric 14, the dispenser 12 has a width 44 that is at least as wide as the width 24 of the reinforcing fabric 14. In the illustrated embodiment of FIGS. 1, 3A-B, the hollow section 26 may have a circular cross section; however, in other embodiments, the hollow section 26 may have different cross sections, e.g., square, hexagonal, octagonal, etc. To minimize production cost, it may be advantageous to construct the hollow section 26 from polyvinyl chloride, e.g., commercially available polyvinyl chloride pipe having a wall thickness of at least approximately 0.10 inches. Other suitable materials may include cardboard, plastics, and other materials selected for low cost and low weight, although other heavier and more expensive materials (e.g., metals) may provide the necessary characteristics. In all cases, the material(s) forming the hollow section 26 and end caps 34, 36 (in embodiments equipped with end caps rather than integral closed ends) should be configured and dimensioned to withstand internal pressures up to approximately twenty pounds per square inch without degradation or rupture.

With continued reference to FIG. 3A, the hollow section 26 may include a slot 46 formed in a wall 48, which may facilitate dispensing the reinforcing fabric 14. In use, a user may dispense the reinforcing fabric 14 through the slot 46 when applying the resin-saturated reinforcing fabric 14 to the compromised pipeline. In order for the reinforcing fabric 14 to pass through the slot 46, the slot 46 may have a width 50 approximates the width 24 of the reinforcing fabric 14. In some embodiments, the slot 46 may have a width 50 that is less than the width 24 of the reinforcing fabric 14; however, in other embodiments the slot 46 may have a width 50 that equals or exceeds the width 24 of the reinforcing fabric 14. The slot 46 may also have a height 52 that is greater than the thickness of the reinforcing fabric 14. In some embodiments, the slot 46 may not extend to either end of the hollow section 26; this may contribute to greater structural integrity of the dispenser 12. However, in other embodiments (not shown), the slot 46 may co-terminate with at least one end of the hollow section 26; such embodiments may facilitate assembly, in particular assembling a seal (described below), loading the reinforcing fabric 14 into the dispenser 12, and extracting a leading portion 54 of the reinforcing fabric 14 through the slot.

Figure 3B:
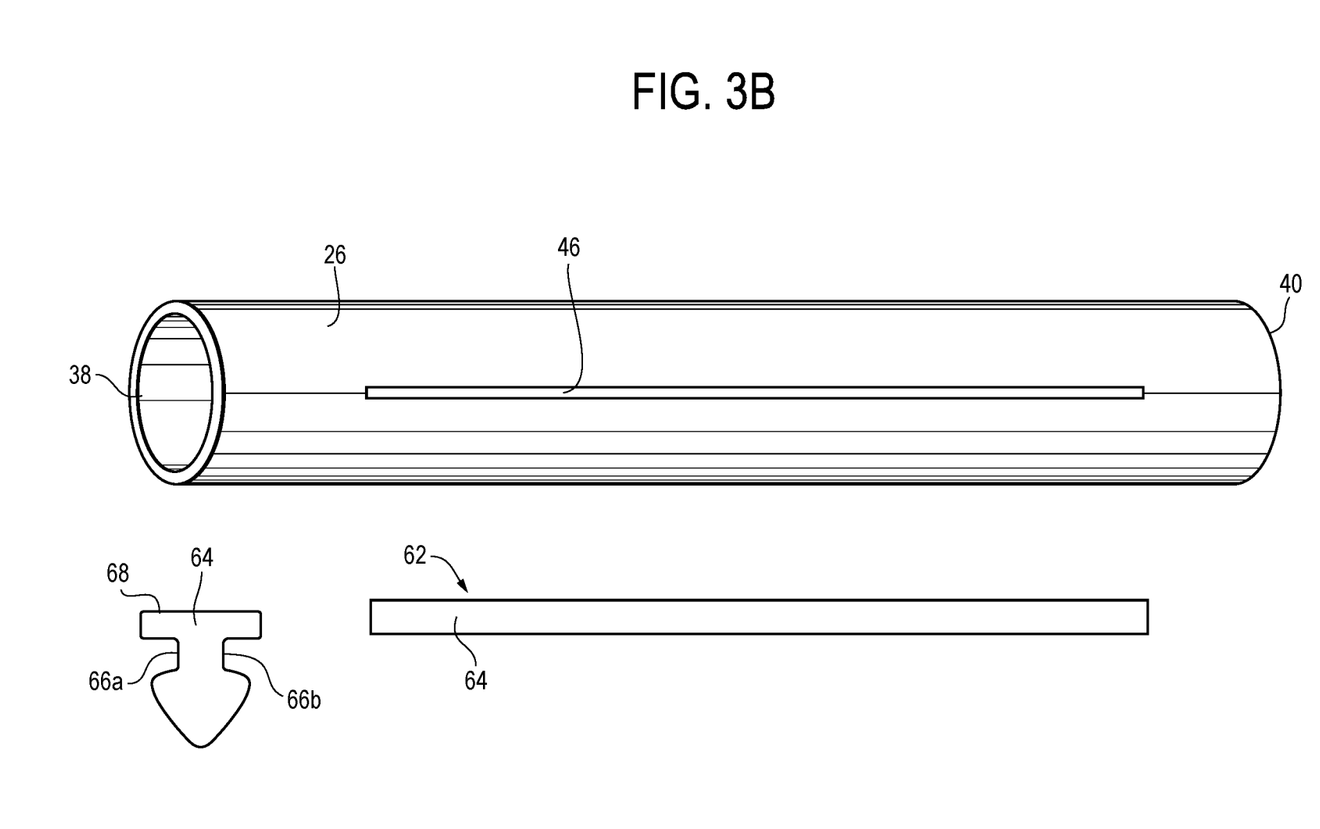
FIG. 3B shows an alternative embodiment of a pipeline and pressure vessel repair system.

The slot 46 may cooperate with a seal 56 that prevents pressure within the internal cavity 28 from escaping when the dispenser 12 is pressurized as described below. The seal 56 may prevent cavity pressure loss through the slot 46 even when the fabric 14 passes through the slot 46, e.g., when the leading portion 54 of the fabric 14 is deployed through the slot 46 and even as the fabric 14 is applied to the compromised pipeline. In the embodiment of FIGS. 1 and 3A, the seal 56 may include a removable plate 58 configured to cover the slot 46. The plate 58 may be constructed from one or more materials similar to the hollow section 26, e.g., polyvinyl chloride, cardboard, metal, plastic, or other materials. The plate 58 may be affixed to the hollow section 26 via screws 60a, 60b or other joining means to ensure the plate 58 maintains fluid-tight contact across the slot 46. Referring now to FIG. 3B, in another embodiment, a seal 62 may include a pliable insert 64 constructed from extruded rubber, silicone, plastic, or similar material. In such embodiments, the insert 64 may have a cross sectional profile that includes one or more detents 66a, 66b and a flange 68. In use, the insert 64 may be inserted through the slot 46 (e.g., slid into the slot 46 in embodiments where the slot 46 co-terminates with one end (38 or 40) or pushed into the slot 46), and the detents 66a, 66b and flange 68 (which remains outside the hollow section 26) enable the insert 64 to seal the slot 46 even when the hollow section 26 is pressurized. After the reinforcing fabric 14 is saturated with resin 16, the insert 64 may be physically removed from the slot 46 prior to applying the fabric 14 to the compromised pipeline. In other embodiments, the seal may include both a plate and an insert. In still other embodiments (not shown), the insert may fit within the slot and may have an opening corresponding with the shape of the slot 46 to enable the fabric 14 to snugly pass through the opening of the insert. In such embodiments, the insert may remain in place within the slot 46 when a user dispenses the reinforcing fabric 14 through the slot 46. That is, the reinforcing fabric 14 may pass through the opening in the insert, and fabric-insert opposition forces may prevent cavity pressure from escaping through the slot 46 even during use. Furthermore, in such embodiments, the opposition forces between the reinforcing fabric 14 and the insert may remove excess resin 16 from the reinforcing fabric 14 as it is deployed through the slot 46, and may enhance saturation by driving resin 16 into the reinforcing fabric 14. In still other embodiments (not shown), the seal may include an inexpensive fluid-impermeable membrane that covers the slot 46 and is temporarily affixed to the hollow section 26 by adhesive or similar means. In use, the membrane may prevent cavity pressure loss through the slot 46 even if the leading portion 54 of the reinforcing fabric 14 is deployed through the slot 46. The membrane may remain in place while the reinforcing fabric 14 becomes saturated, but may be removed before applying the saturated reinforcing fabric 14 to the compromised pipeline.

Referring to FIG. 4 in connection with FIGS. 1, 3A-B, some embodiments of the dispenser 12 may include one or more end caps 34, 36 that may be fixed to the ends 38, 40 of the hollow section 26. Such end caps 34, 36 may be constructed from similar material as the hollow section 26; however, the end caps 34, 36 may be constructed from different materials to reduce cost, weight, or for other benefit. One example of a suitable end cap is a polyvinyl chloride end cap, which may be affixed by threads or adhesive to the hollow section. The end caps 34, 36 should be constructed to prevent loss of cavity pressure when the dispenser 12 is pressurized, as described below.

In embodiments in which the reinforcing fabric 14 is mounted upon a rod 22, dowel, axle, or similar component, one or more of the closed ends 30, 32 of the dispenser 12 (including one or more of the end caps 34, 36) may include a centrally-located aperture 70 sized to receive the rod 22 and enable rotation of the rod 22 within the internal cavity 28. The aperture 70 may include an integral seal 72 to prevent loss of cavity pressure. In the embodiment of FIG. 1, end caps 34, 36 form the closed ends 30, 32, and therefore include apertures 70 to receive the rod 22.

Figure 8:
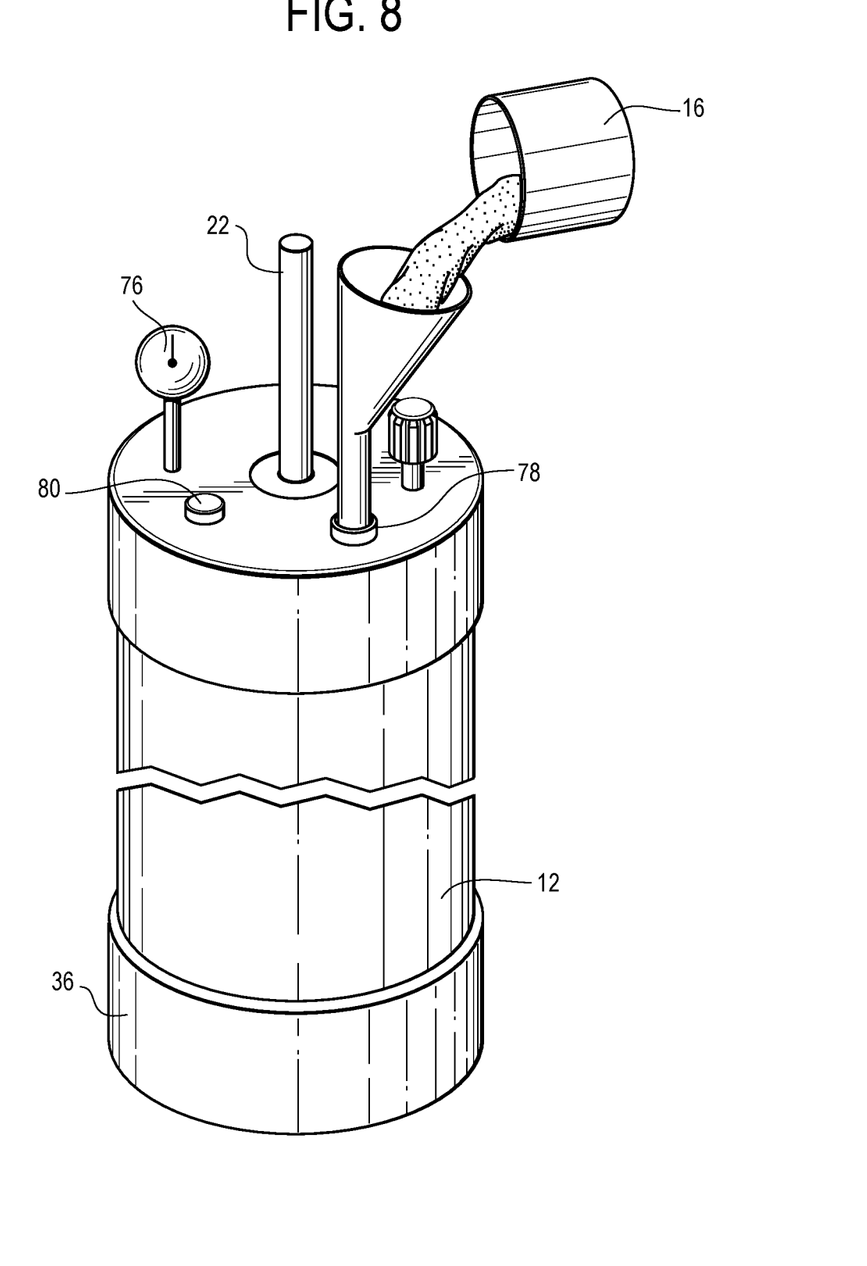
FIG. 8 shows one aspect of a method of utilizing an alternative pipeline and pressure vessel repair system.

The dispenser 12 may include fluid input port 74 through which a user may introduce pressurized fluid into the internal cavity 28 of the dispenser 12. Such pressurized fluid may include pressurized gas (e.g., air, oxygen, inert gas, or other gas), liquid (e.g., water, epoxy, hardening agent, or other liquid), and/or liquid foams. Fluid input port 74 may include a valve, e.g., a Schrader valve, a Presta valve, or similar valve to enable one-way passage of pressurized fluid with relatively low cost and simplicity. To indicate pressure within the cavity 28, some embodiments may include a pressure gauge 76. In other embodiments, the dispenser 12 may not include a pressure gauge 76, which instead may be provided on a reusable air pump or affixed to other source of pressurized fluid to reduce the cost associated with the dispenser 12. Alternatively, the user may use a separate pressure gauge to read the pressure within the dispenser 12 off the fluid input port 74. The fluid input port 74 and pressure gauge 76 may be mounted on one of the closed ends 30, 32 (including end caps 34, 36), on the hollow section 26, or elsewhere on the dispenser 12. In some embodiments (as shown in FIG. 8), at least one of the ends 30, 32 of the dispenser 12 may include a pour hole 78; in such embodiments, one or more of the ends 30, 32 may include a separate vent hole 80; alternatively, the pour hole 78 may be sufficiently large to enable venting.

Figure 5:
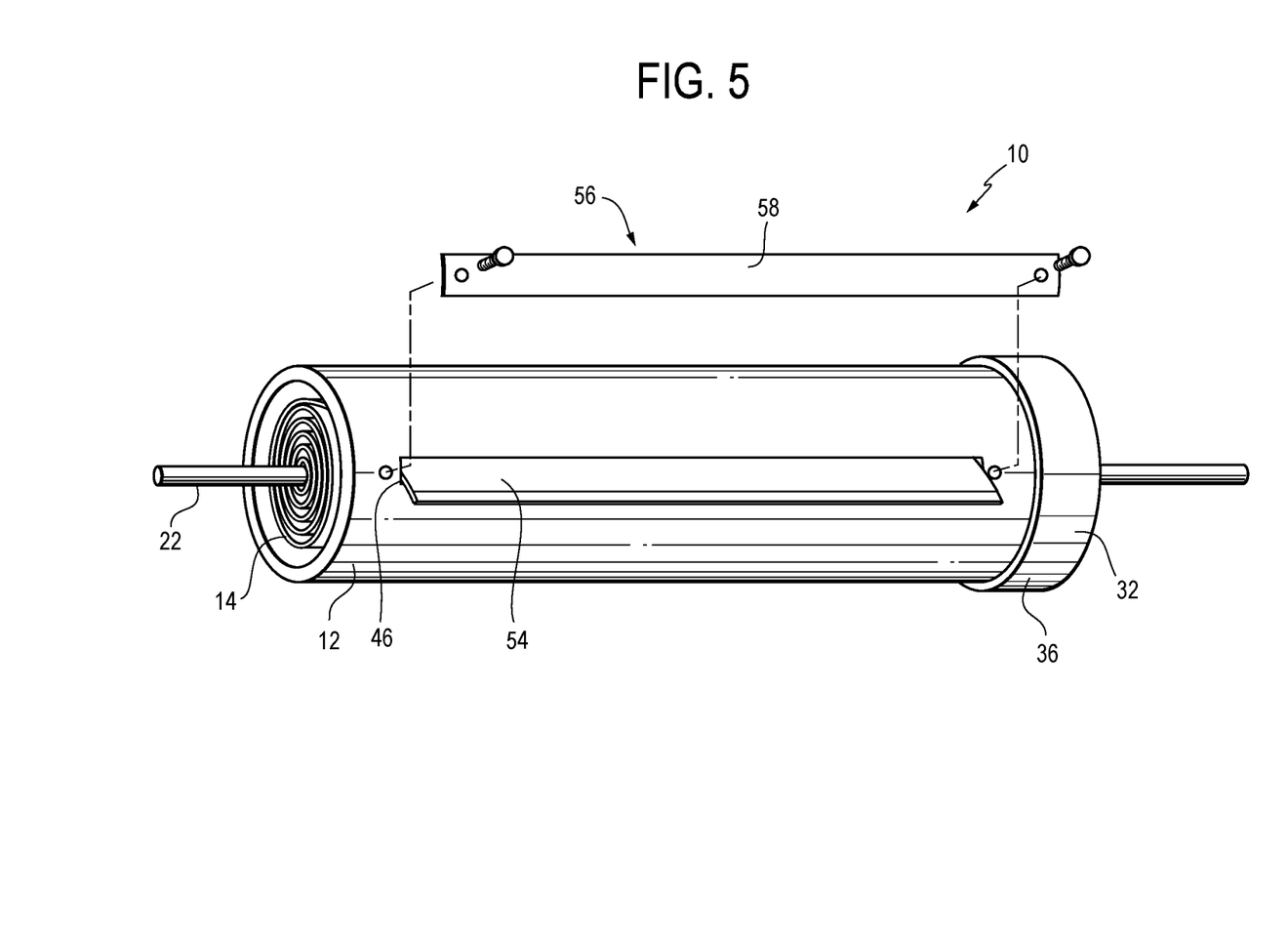
FIG. 5 shows other aspects of the pipeline and pressure vessel repair system of FIG. 1.

FIG. 5 illustrates the pipeline repair system 10 of FIG. 1 in a partially assembled state, in which the reinforcing fabric 14 is rolled on the rod 22 and loaded within the dispenser 12. The fabric 14 may be loaded into the dispenser 12 prior to sale (i.e., sold as a pre-loaded dispenser 12) or may be loaded into the dispenser 12 by a user at a later time. In the illustrated embodiment, the second end cap 36 forms the second closed end 32 of the dispenser 12. The dispenser 12 further includes the slot 46 through which the leading portion 54 of the reinforcing fabric 14 protrudes. The seal 56 includes the plate 58 removably secured over the slot 46 and the leading portion 54 of the reinforcing fabric 14. In a final assembled state (see FIG. 1), the first end cap 34 forms the first closed end 30 of the dispenser 12.

In use, one or more users may utilize the pipeline repair systems disclosed herein. Although this application refers to "a user," it shall be understood that the same "user" need not perform all steps of the disclosed methods; rather, more than one user may execute one or more steps. Although the systems and methods disclosed herein are designed to minimize exposure to chemicals and physical exertion, users are advised to take appropriate safety precautions at all times, including wearing protective clothing and eye protection and working with others as necessary to safely lift and manipulate the pipeline repair system.

To utilize the disclosed systems, a user may first locate an anomaly in a compromised pipeline. Once located, the user may reduce the pipeline pressure as necessary to ensure safe repair, although this may not always be necessary. The user may further characterize the anomaly by its location, nature (e.g., a deficit, crack, etc.), size, depth, or other characteristic. Based upon the qualities of the anomaly and upon the specification of the pipeline itself as well as the operating environment, the user may select a system as described above for repairing the compromised pipeline. Preferably, the system's reinforcing fabric 14 may have sufficient width 24 to extend at least six inches beyond the anomaly on either side, and may have sufficient length to wrap around the pipeline at the location of the anomaly at least five times, e.g., seven to ten times. The fabric-reinforced polymeric composite (including the reinforcing fabric 14 and resin 16), when applied to the anomaly and after curing, should provide sufficient strength to enable the compromised pipeline to resume operation at maximum allowable operating pressure. In order to comply with certain standards, e.g., ASTM PCC 2 and Title 49, Part 192 of the Code of Federal Regulations, a combination of carbon-reinforced fabric and resin may be selected to withstand at least approximately 150% of the maximum allowable operating pressure of the compromised pipeline.

Figure 6:
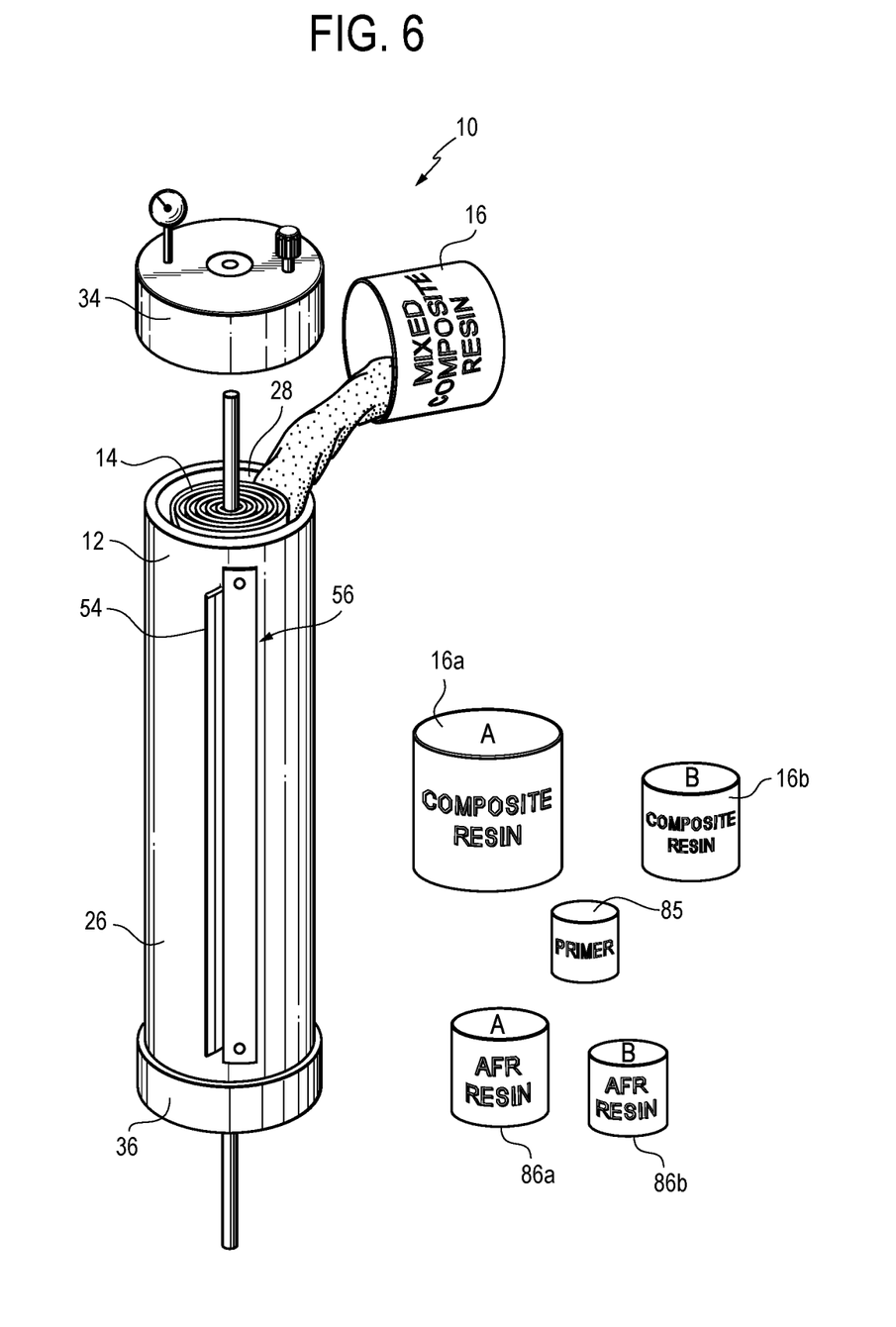
FIG. 6 shows one aspect of a method of utilizing the pipeline and pressure vessel repair system of FIG. 1.

Referring now to FIG. 6, one embodiment of a partially assembled system 10 for repairing pipelines and/or pressure vessels may include the dispenser 12, quantity of reinforcing fabric 14, quantity of primary resin 16 (which may include separate resin components 16a, b), a quantity of cross-linking primer 85 to ensure bond and crosslinking between the compromised pipe and resin 16, and a quantity of anomaly-filling resin 86 (including separate components 86a, b). Components of the system 10 may be sold disassembled; however, the system 10 may also be sold in partially or completely assembled configurations to facilitate use and to reduce shelf footprint at the point of sale. In preparation to receive the activated primary resin 16, the user should partially assemble the dispenser 12 (if using a system 10 not already partially assembled) before mixing the resin components 16a, b, e.g., by securing the second end cap 36 to the hollow section 26, inserting the reinforcing fabric 14 into the hollow section 26, pulling the leading portion 54 of the reinforcing fabric 14 through the slot 46 (or sliding the leading portion 54 down the slot 46), and sealing the slot 46 with the seal 56.

Figure 7:
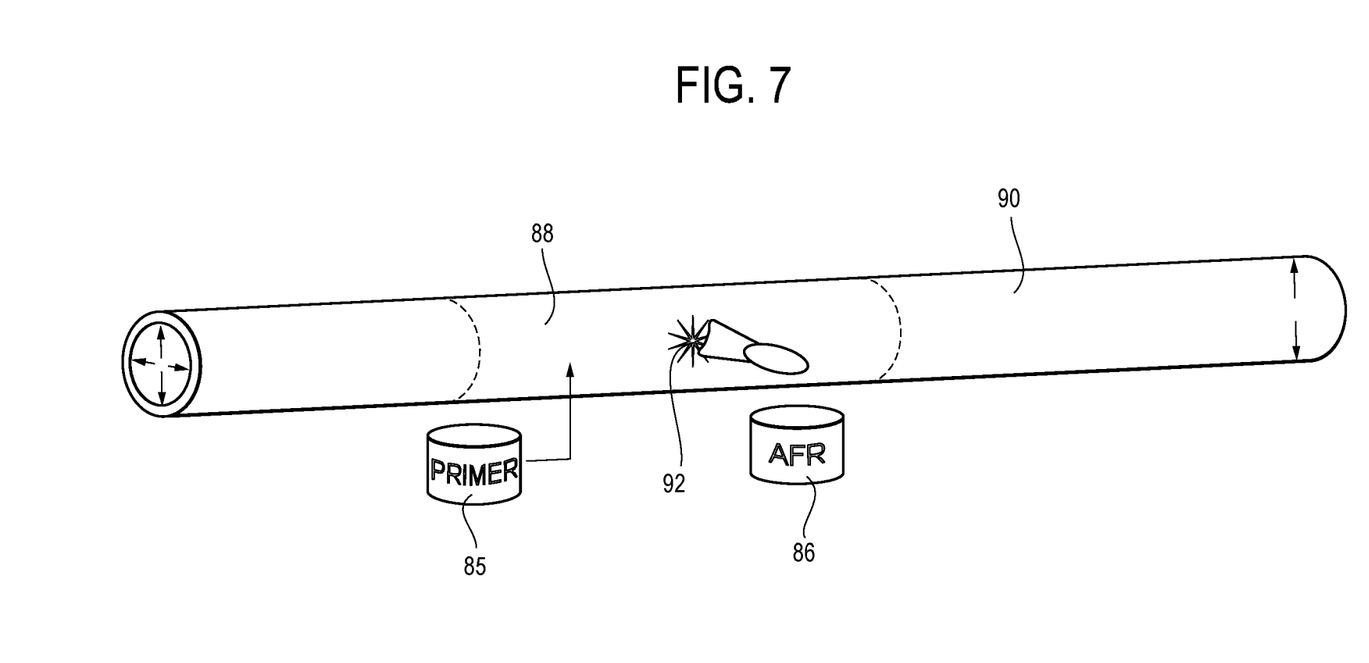
FIG. 7 shows another aspect of a method of utilizing the pipeline and pressure vessel repair system of FIG. 1.

Referring to FIG. 7, to improve the efficacy of any subsequent repair, the user may optionally first remove any coating from the surface 88 of the compromised pipeline 90 surrounding the anomaly 92 (including any surface area that will interface with the fabric-reinforced polymeric composite), and may then optionally further prepare the surface 88 around the anomaly 92, e.g., by sanding and/or grit blasting and cleaning. Following such optional preliminary steps, the user may apply the anomaly filling resin 86 to the anomaly 92, for example to augment any deficit or crack to ensure the compromised pipeline surface 88 is uniform at the anomaly location and the surrounding area. Subsequently, the user may prime the compromised pipeline surface 88 with the cross-linking primer 85 to enhance subsequent attachment of the fabric-reinforced polymeric composite.

Referring again to FIG. 6, after the user preps the compromised pipeline 90 according to the optional steps above, the user mixes the primary resin components 16a, b together to activate resin 16 and initiate the curing process. Once the curing process begins, the user should diligently complete the repair process as described below before resin 16 reaches the end of its pot life and becomes unworkable. Once the user activates the resin 16, the user adds the activated resin 16 to the internal cavity 28 of the dispenser 12. In embodiments with one or more removable end caps 34, 36, the user may secure one end cap (34 or 36), turn the dispenser 12 upright, and then pour the activated resin 16 directly into the internal cavity 28 before securing the other end cap (36 or 34). Referring to the alternative embodiment of FIG. 8, in embodiments equipped with a pour hole 78 and vent hole 80, the user may pour the activated resin 16 through the pour hole 78, allowing the cavity 28 to vent through the vent hole 80. In alternative embodiments where the reinforcing fabric 14 is pre-saturated with an inactive resin component (e.g., resin component 16a or b), the user may pour another resin component (e.g., resin component 16b or a) into the cavity 28 to form the activated resin 16. Thus, the resin 16 may be activated within the dispenser 12 itself in some embodiments. This may advantageously facilitate the pipeline repair process. The user may add enough resin 16 (or resin component) into the dispenser 12 to completely cover the reinforcing fabric 14, leaving a small portion of the internal volume within the dispenser 12 free from resin 16. Such "total coverage" methods may result in the fastest possible saturation. According to other methods however, the user may pour less resin 16 into the dispenser than is necessary to completely cover the reinforcing fabric 14. Such methods may save weight and expense associated with excess resin 16, but may result in slower saturation.

Figure 9:
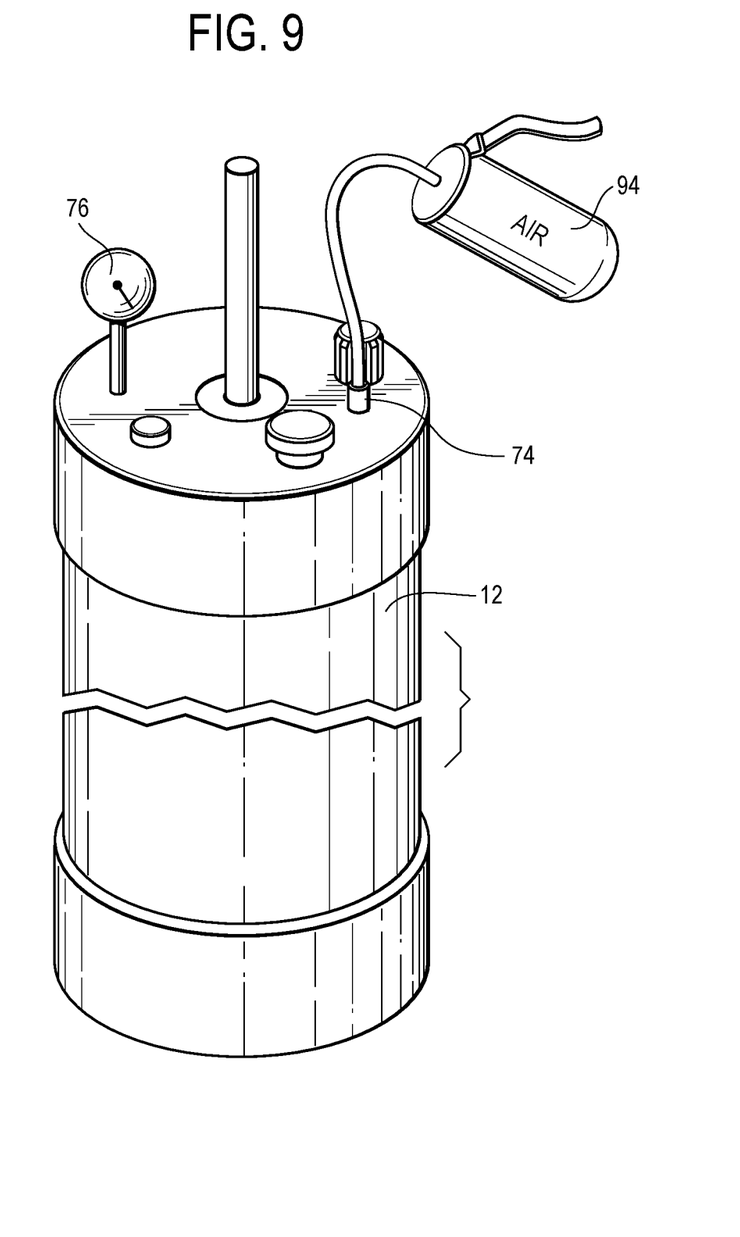
FIG. 9 shows another aspect of a method of utilizing a pipeline and pressure vessel repair system.

After the user pours the activated resin 16 into the dispenser 12 (or after the user activates a resin component already located in the dispenser 12), then user may then seal the dispenser 12, e.g., by securing the other end cap (34 or 36) to the hollow section 26, and/or by plugging the pour hole 78 and other apertures in the dispenser 12 (e.g., vent hole 80). Referring to FIG. 9, when the dispenser 12 is sealed, the user then pressurizes the dispenser 12 via the fluid input port 74 to approximately 5-15 pounds per square inch ("psi"), e.g., 10 psi. For safety reasons, it may not be desirable to pressurize the dispenser 12 beyond approximately 20 psi. The user may execute this step in a number of ways, for example by introducing pressurized fluid into the dispenser 12 with an air compressor, a hand pump 94 (as shown in FIG. 9), a pressurized pressure vessel, or similar means. For economic reasons or for other benefit, the fluid used to pressurize the dispenser 12 may be air and/or another gas or liquid as described above. The user may monitor the dispenser pressure on a pressure gauge 76, which may be separate or may be equipped on the dispenser 12 or pump 94. Alternatively, the user may use a pressure gauge to read the dispenser pressure off the fluid input port 74. By executing the pressurization step, the pressure within the dispenser 12 drives the resin 16 into the reinforcing fabric 14, thereby saturating the reinforcing fabric 14 with the resin 16. Because the leading portion 54 of the reinforcing fabric 14 may be pre-dispensed through the slot 46, it may not saturate (i.e., it may remain dry). In some embodiments, the fabric 14 may be deemed to have achieved a saturated state even though the entire quantity of reinforcing fabric 14 is not saturated with resin 16, e.g., when the resin 16 permeates at least 75% of the reinforcing fabric 14. Saturation may be complete after a saturation period, e.g., approximately 30 seconds to approximately 15 minutes, for example one minute, three minutes, five minutes, and ten minutes. The user may keep the dispenser 12 pressurized during the saturation period. Optionally, the user may continue to introduce pressure into the dispenser 12 to offset any pressure drop, taking care not to over-pressurize the dispenser 12. If the user did not add sufficient resin 16 to cover the entire reinforcing fabric 14 initially, then during the saturation period, the user may manipulate the dispenser 12 in order for the resin 16 to coat the entire reinforcing fabric 14. For example, if the user adds enough resin 16 to cover only half the reinforcing fabric 14, then the user may invert the dispenser 12 vertically in order to cover the other half of the reinforcing fabric 14 with the resin 16. Likewise, the user may lay the dispenser 12 on its side, and then rotate the dispenser 12 about its longitudinal axis (i.e., the axis parallel with the rod 22 in some embodiments) periodically during the saturation period in order for the resin 16 to cover and saturate the entire reinforcing fabric 14. The saturation period may vary directly with the quantity of reinforcing fabric 14 in the dispenser (particularly the width 24 and length of the reinforcing fabric 14) and the viscosity of the resin 16. For example, one embodiment of the pipeline repair system 10 described above with a 48"-wide, 100" long roll of reinforcing fabric 14 will likely take longer to saturate than another embodiment with a 24"-wide, 50" long roll of reinforcing fabric 14, all else equal.

After the saturation period elapses, the user may optionally depressurize the dispenser 12, e.g., by opening a pressure relief valve or vent hole 80, or by venting pressure through the seal 56 (e.g., by slowly removing the plate 58 from the slot 46). In some embodiments, it may not be necessary to depressurize the dispenser 12, as the dispenser pressure may gradually decline as the user dispenses resin-saturated reinforcing fabric 14 through the slot 46.

Once saturated with resin 16, the reinforcing fabric 14 is ready for application to the compromised pipeline 90. If the seal 56 is equipped with a plate 58, insert 64, membrane, or other removable apparatus, the user may then remove that apparatus. In embodiments where the leading portion 54 of the reinforcing fabric 14 is deployed through the slot (most embodiments), the user may pull the leading portion 54 to cause the dispenser 12 to dispense the resin-saturated reinforcing fabric 14. The user may trim off the dry leading portion 54, e.g., after gripping the leading portion 54 to dispense fabric 14 and after partially wrapping the fabric 14 around the compromised pipeline 90.

Figure 10:
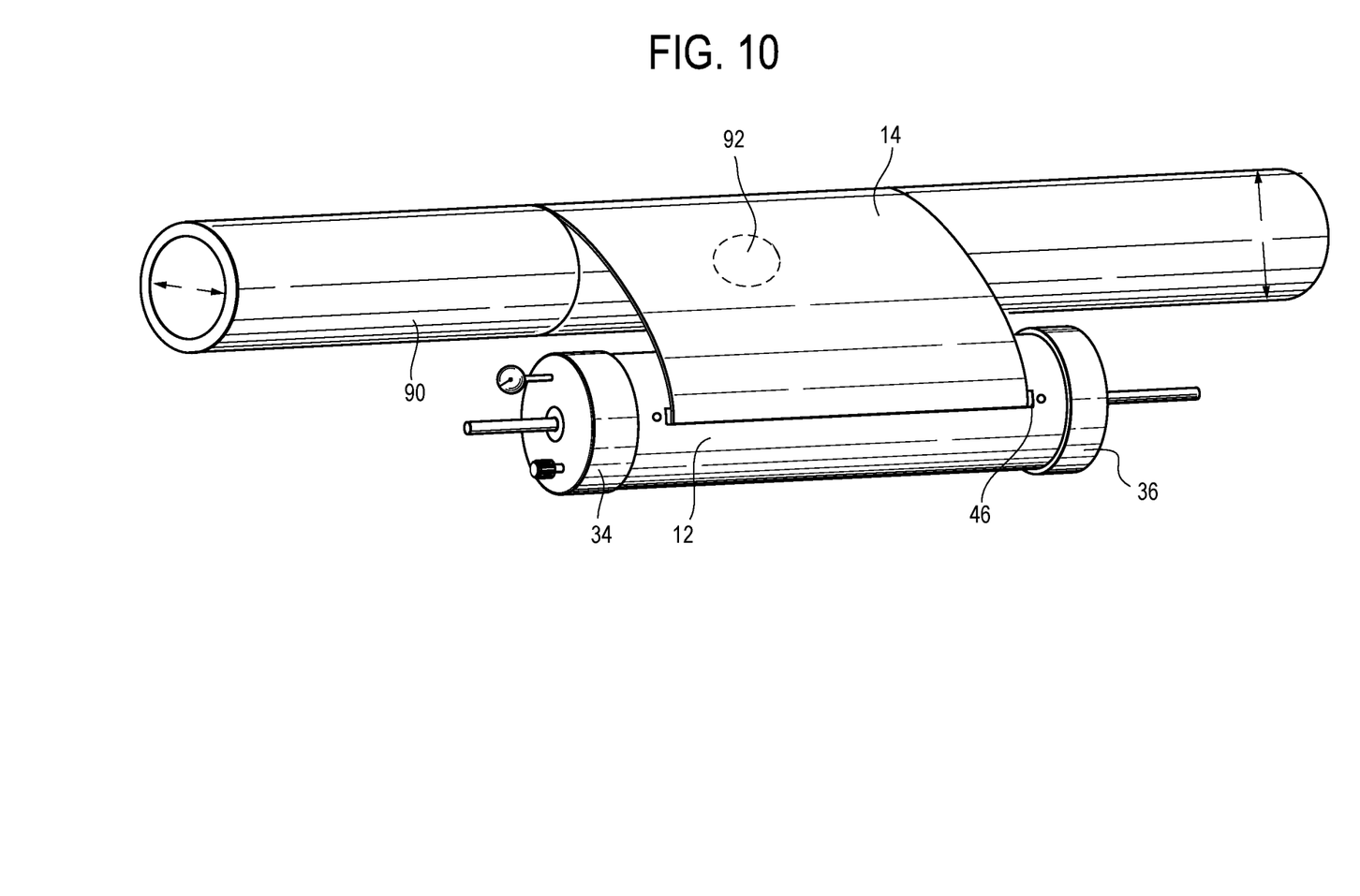
FIG. 10 shows another aspect of a method of utilizing a pipeline and pressure vessel repair system.

Referring to FIG. 10, the user may wrap the resin-saturated reinforcing fabric 14 around the anomaly 92 under slight tension, taking care that at least six inches of reinforcing fabric 14 extend beyond either side of the anomaly 92 if possible. Preferably, the user should execute at least five complete wraps around the compromised pipeline 90, although seven, eight, nine, ten, or greater number of complete wraps may provide a stronger repair.

After completing the wrapping step, the user may cut the wrapped reinforcing fabric 14 from any un-dispensed reinforcing fabric 14 that remains within the dispenser 12. At this point, the user may leave the resin-saturated fabric 14 to completely cure via exothermic reaction, thereby forming a fabric-reinforced polymeric composite that increases the structural integrity of the compromised pipeline 90 at the anomaly location. If it is desirable to accelerate the exothermic curing process, the user may optionally apply a safe external heat source to the saturated reinforcing fabric 14, e.g., an electric thermal wrap. After the repair is complete, the user may responsibly discard the remaining system components (e.g., the dispenser 12 and excess resin 16 contained within).

While various embodiments of the invention have been described, the invention is not to be restricted except in light of the attached claims and their equivalents. Moreover, the advantages described herein are not necessarily the only advantages of the invention and it is not necessarily expected that every embodiment of the invention will achieve all of the advantages described.

I claim:

1. A system for reinforcing a pipeline or pressure vessel, comprising:
   a quantity of fabric having a first width;
   a resin;
   a dispenser comprising a first end, a second end, a slot formed in a wall, wherein the dispenser is pressurizable via a fluid input to a pressurized state; and
   a seal configured to permit the quantity of fabric to pass through the slot and retain pressure within the dispenser;
   wherein the dispenser is configured to dispense the quantity of fabric through the slot.

2. The system of claim 1, wherein the slot has a second width that is greater than or equal to the first width.

3. The system of claim 1, wherein the seal is configured to retain at least five pounds per square inch of pressure within the dispenser while the quantity of fabric passes through the slot.

4. The system of claim 1, wherein the seal comprises at least one of a movable plate and a removable insert.

5. The system of claim 1, wherein a length of the quantity of fabric is at least five times longer than a circumference of the pipeline or pressure vessel to be repaired.

6. The system of claim 1, wherein the dispenser comprises a hollow section, a first end cap, and a second end cap.

7. The system of claim 1, wherein the resin has a viscosity not greater than 1.5 centipoise.

8. The system of claim 1, wherein the quantity of fabric is mounted upon a rod comprising resin access apertures.

9. A system, comprising:
   a resin; and
   a quantity of fabric installed within a dispenser comprising a first end, a second end, a fluid input, a slot, and a seal configured to permit the quantity of fabric to pass through the slot and retain pressure within the dispenser;
   wherein the dispenser is configured to dispense the quantity of fabric through the slot;
   wherein the dispenser is configured to be pressurized via the fluid input up to at least five pounds per square inch;
   wherein a leading portion of the quantity of fabric is pre-loaded through the slot.

10. The system of claim 9, wherein the quantity of fabric has a first width, and wherein the slot has a second width that is greater than or equal to the first width.

11. The system of claim 9, wherein the seal is configured to retain at least five pounds per square inch of pressure within the dispenser while the quantity of fabric passes through the slot.

12. A method for repairing a pipeline or pressure vessel, comprising:
   adding an activated resin into a dispenser containing a quantity of fabric having a first width, the dispenser comprising a slot formed in a wall and having a second width that is greater than or equal to the first width, the dispenser further comprising a seal adapted to the slot and configured to permit the quantity of fabric to pass through the slot;
   pressurizing the dispenser;
   waiting for at least part of the quantity of fabric to achieve a saturation state; and
   dispensing the at least part of the quantity of fabric that achieves the saturated state through the slot.

13. The method of claim 12, further comprising removing the seal from the slot prior to dispensing the at least part of the quantity of fabric.

14. The method of claim 12, wherein adding the activated resin into the dispenser comprises putting enough activated resin to submerge the quantity of fabric.

15. The method of claim 12, further comprising depressurizing the dispenser before dispensing at least part of the quantity of fabric through the slot.

16. The method of claim 12, wherein dispensing at least part of the quantity of fabric through the slot comprises wrapping at least part of the quantity of fabric around an anomaly after the quantity of fabric achieves the saturated state by dispensing the quantity of fabric through the slot.

17. The method of claim 12, further comprising:
   removing an exterior coating from a repair area around the anomaly;
   preparing the repair area; and
   applying a first product to fill the anomaly.

18. The method of claim 12, wherein pressurizing the dispenser comprises pressurizing the dispenser to at least three pounds per square inch.

19. The method of claim 12, wherein pressurizing the dispenser comprises pressurizing the dispenser to at least ten pounds per square inch.

20. The method of claim 12, wherein the saturated state is achieved when the activated resin penetrates at least 75% of the quantity of fabric.

* * * * *